US012687878B2

(12) United States Patent
Gutermuth et al.

(10) Patent No.: US 12,687,878 B2
(45) Date of Patent: Jul. 21, 2026

(54) HAPTIC CONTROL DEVICE IN A MOTOR VEHICLE

(71) Applicant: Continental Automotive GmbH, Hannover (DE)

(72) Inventors: Uwe Gutermuth, Darmstadt (DE); Peter Lotz, Bischofsheim (DE); Marc Matysek, Hofheim (DE)

(73) Assignee: Continental Automotive Technologies GmbH, Hannover (DE)

( * ) Notice: Subject to any disclaimer, the term of this patent is extended or adjusted under 35 U.S.C. 154(b) by 136 days.

(21) Appl. No.: 17/785,111

(22) PCT Filed: Dec. 16, 2020

(86) PCT No.: PCT/EP2020/086430
§ 371 (c)(1),
(2) Date: Jun. 14, 2022

(87) PCT Pub. No.: WO2021/122754
PCT Pub. Date: Jun. 24, 2021

(65) Prior Publication Data
US 2023/0029716 A1     Feb. 2, 2023

(30) Foreign Application Priority Data
Dec. 18, 2019     (DE) ..................... 10 2019 220 095.8

(51) Int. Cl.
G05G 1/02          (2006.01)
B60K 35/10        (2024.01)
(Continued)

(52) U.S. Cl.
CPC ............... *G05G 1/02* (2013.01); *B60K 35/10* (2024.01); *G05G 1/025* (2013.01); *G05G 5/03* (2013.01);
(Continued)

(58) Field of Classification Search
CPC ....................................................... G06F 3/016
(Continued)

(56) References Cited

U.S. PATENT DOCUMENTS 8,878,655  B2    11/2014   Sormunen
2011/0276878  A1    11/2011   Sormunen
(Continued)

FOREIGN PATENT DOCUMENTS

CN          103246390 A      8/2013
DE     112011101553 T5      3/2013
(Continued)

OTHER PUBLICATIONS

Machine translation of DE-102016223021-A1. (Year: 2018).*
(Continued)

*Primary Examiner* — Randell J Krug
(74) *Attorney, Agent, or Firm* — Buchanan Ingersoll & Rooney PC

(57) ABSTRACT

A haptic operator control device in a motor vehicle, comprises an input unit, wherein the input unit can be moved by an actuator unit coupled to the input unit, wherein the input unit has a surface, wherein the surface can be touched by an input member of an operator, wherein the input unit and the actuator unit are movably mounted in relation to the motor vehicle.

8 Claims, 2 Drawing Sheets

(51) Int. Cl.

| | |
|---|---|
| *G05G 5/03* | (2008.04) |
| *G05G 25/02* | (2006.01) |
| *G06F 3/01* | (2006.01) |
| *B60K 35/22* | (2024.01) |
| *B60K 35/25* | (2024.01) |

(52) U.S. Cl.
CPC ............. *G05G 25/02* (2013.01); *G06F 3/016* (2013.01); *B60K 35/22* (2024.01); *B60K 35/25* (2024.01); *B60K 2360/128* (2024.01); *B60K 2360/1438* (2024.01); *G05G 2505/00* (2013.01)

(58) Field of Classification Search
USPC ........................................................ 345/174
See application file for complete search history.

(56) References Cited

U.S. PATENT DOCUMENTS

| | | | |
|---|---|---|---|
| 2012/0038568 A1 | 2/2012 | Colloms et al. | |
| 2013/0201127 A1* | 8/2013 | Abe ........................ | G06F 3/016 |
| | | | 345/173 |
| 2018/0074588 A1* | 3/2018 | Colloms ................ | G06F 3/016 |
| 2018/0186304 A1* | 7/2018 | Wachinger ............ | H03K 17/96 |
| 2019/0163280 A1 | 5/2019 | Schwab et al. | |
| 2019/0187796 A1* | 6/2019 | Schreurs ................ | G06F 3/016 |
| 2019/0196622 A1 | 6/2019 | Zadesky et al. | |
| 2021/0286430 A1 | 9/2021 | Schwab et al. | |

FOREIGN PATENT DOCUMENTS

| | | | | |
|---|---|---|---|---|
| DE | 112011101553 B4 | 8/2016 | | |
| DE | 102016223021 A1 * | 5/2018 | ............ | G06F 3/016 |
| DE | 102018000446 A1 | 7/2019 | | |
| DE | 102018108040 A1 | 10/2019 | | |
| WO | 2016128673 A1 | 8/2016 | | |
| WO | 2018046302 A1 | 3/2018 | | |

OTHER PUBLICATIONS

Search Report dated Nov. 24, 2020 from corresponding German patent application No. 10 2019 220 095.8.

International Search Report and Written Opinion dated Apr. 12, 2021 from corresponding International patent application No. PCT/EP2020/086430.

Examination Report dated Sep. 8, 2023 from corresponding European patent application No. 20835744.2.

Office Action issued Oct. 26, 2024 from corresponding Chinese patent application No. 202080084739.9.

* cited by examiner

HAPTIC CONTROL DEVICE IN A MOTOR VEHICLE

CROSS-REFERENCE TO RELATED APPLICATION

This U.S. patent application claims the benefit of PCT patent application No. PCT/EP2020/086430, filed Dec. 16, 2020, which claims the benefit of German patent application No. 10 2019 220 095.8, filed Dec. 18, 2019, both of which are hereby incorporated by reference.

TECHNICAL FIELD

The disclosure relates to a haptic operator control device in a motor vehicle, in which an input unit can be moved by at least one actuator coupled to the input unit, wherein the input unit has a surface and wherein the surface can be touched by an input member of an operator.

BACKGROUND

Prior so-called haptic operator control devices, in which inputs can be made on a so-called touchpad or touchscreen by an input member, for example an operator's finger, and the operator receives tactile feedback in his finger by the surface of the touchpad or touchscreen being moved perpendicularly or parallel to their surface and this movement is being perceptible by the finger. The operator can thus be given feedback that touching the touchpad or touchscreen was recognized by the operator control device, without the operator having to look at the touchscreen or the touchpad and thus being less distracted from his actual driving task in the motor vehicle.

In the course of development, the touchpads or touchscreens have become larger and larger, so that with larger touchpads or touchscreens, movement of the touchpads or touchscreens results in an undesirable rolling motion of the motor vehicle and a dull thud can also be heard due to the sudden movement.

It is therefore the object of the disclosure to specify a haptic operator control device for a motor vehicle in which there is no rolling motion and no dull thud even when a larger touchpad or touchscreen is moved.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY

A haptic operator control device in a motor vehicle comprises an input unit, wherein the input unit can be moved by an actuator unit coupled to the input unit. The input unit has a surface, wherein the surface can be touched by an input member of an operator, wherein the input unit and the actuator unit are movably mounted in relation to the motor vehicle.

The impulses that occur are not introduced into the motor vehicle and the impulses of the actuator unit and the input unit cancel each other out, at least in part, since they act in opposite directions.

According to an embodiment, the actuator unit and the input unit have the same resonant frequency, wherein the opposing impulses cancel each other out even better.

According to an embodiment, the input unit is mounted with a first spring device and the actuator unit is mounted with a second spring device. The resonant frequencies of the input unit and the actuator unit can be matched to one another.

The matching of the resonant frequencies is particularly good when:

stiffness of the first spring device/mass of the input unit=stiffness of the second spring device/mass of the actuator unit.

According to an embodiment, the input unit has a display, a wide variety of programs, program parts and/or values that can be operated with the input unit and the operator can be simultaneously informed of the programs, program parts and/or values that can currently be selected and shown which position on the display he must touch in order to bring about certain desired reactions of an electrical or electronic device activated by the operator control unit.

According to an embodiment, the display is simple and inexpensive if it is an electro-optical display. However, electromechanical or non-modifiable displays may also be provided. A non-modifiable display may be realized for example by printing or other coating on the surface of the input unit.

According to an embodiment, the input unit may be moved perpendicularly to its surface, wherein the movement may be easily detected as such by a finger of a person using the haptic operator control device.

According to an embodiment, the input unit may be moved parallel to its surface, in some circumstances a simpler solution for the mechanical structure of the haptic operator control device may be found in contrast to the vertical movement. With only small movements, a fingertip cannot tell whether the input unit is being moved perpendicularly or parallel to its surface.

According to an embodiment, the haptic operator control device is additionally mounted by bearings, degrees of movement of the operator control unit may be precisely defined. The bearings may be designed for example as roller bearings, ball bearings or plain bearings.

Other objects, features and characteristics of the present disclosure, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the embodiment of the disclosure, are intended for purposes of illustration only and are not intended to limit the scope of the disclosure.

BRIEF DESCRIPTION OF THE DRAWINGS

The disclosure will become more fully understood from the detailed description and the accompanying figures, wherein.

DETAILED DESCRIPTION

Figure 1:
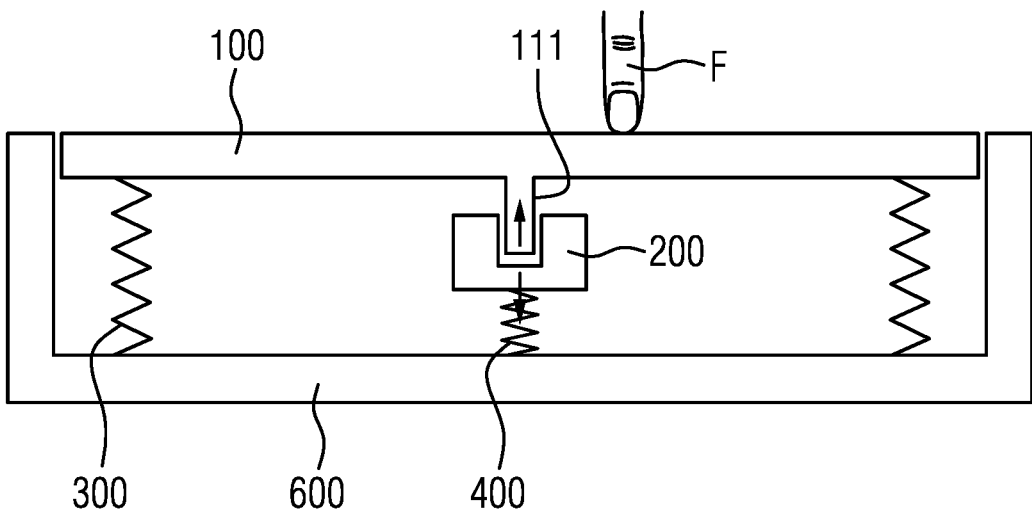
FIG. 1 shows a section through a first embodiment of the disclosure and a finger of a possible operator of the haptic operator control device.

In FIG. 1, a first embodiment of a haptic operator control device according to the disclosure may be seen, comprising an input unit 100, an actuator unit 200 coupled to the input unit 100, two first spring elements 300, a second spring element 400 and a housing 600. The input unit 100 has a coupling part 111. The actuator unit 200 has a single actuator, which is coupled to the input unit 100 by way of the coupling part 111. Furthermore, the actuator unit 200 is connected to the housing 600 by way of the second spring element 400. The input unit 100 is also connected to the housing 600 by way of the two first spring elements 300. An additional bearing of the input unit 100 can optionally be dispensed with. In an embodiment, it is also possible to provide one or more bearings between the input unit 100 and the housing 600 to prevent the input unit 100 from moving sideways. These bearings may be designed for example as plain bearings, ball bearings or roller bearings. A finger F of an operator (otherwise not shown) of the operator control device touches the surface of the input unit 100. This touching is detected and evaluated by a sensor system (not shown), and the actuator unit 200 is activated, so that the actuator unit 200 moves the input unit 100 by way of the coupling part 111. Here, the actuator unit 200 and the input unit 100 perform movements in opposite directions, so that their impulses cancel each other out. The actuator unit 200 may attract or repel the input unit 100 by way of the coupling part 111. As shown, the coupling part 111 may be designed as part of the operator control unit 100. However, it may also be designed as a separate component, which is connected to the input unit 100. As shown, the housing 600 may be a separate housing, which is intended for installation in a body of a motor vehicle. However, the housing 600 may also already be part of a body structure of a motor vehicle that is otherwise not shown. The first spring elements 300 and the second spring element 400 are designed in such a way that stiffness of the first spring device/mass of the input unit=stiffness of the second spring device/mass of the actuator unit. A display (not shown) which can be perceived by the possible operator of the input unit 100 may be arranged in the input unit 100. This display may consist for example of printing on the surface of the input unit 100. An electro-optical display is particularly advantageous since different selectable programs, sub-programs and/or values can then be displayed and set using the operator control unit. The input unit 100 and the actuator unit 200 are each mounted in such a way that they are movable in the functioning direction of the actuator 200, but are fixed in the other directions. The bearings (not shown) may be designed for example as ball bearings, roller bearings or plain bearings. This also applies to the following embodiments in FIGS. 2 and 3.

Figure 2:
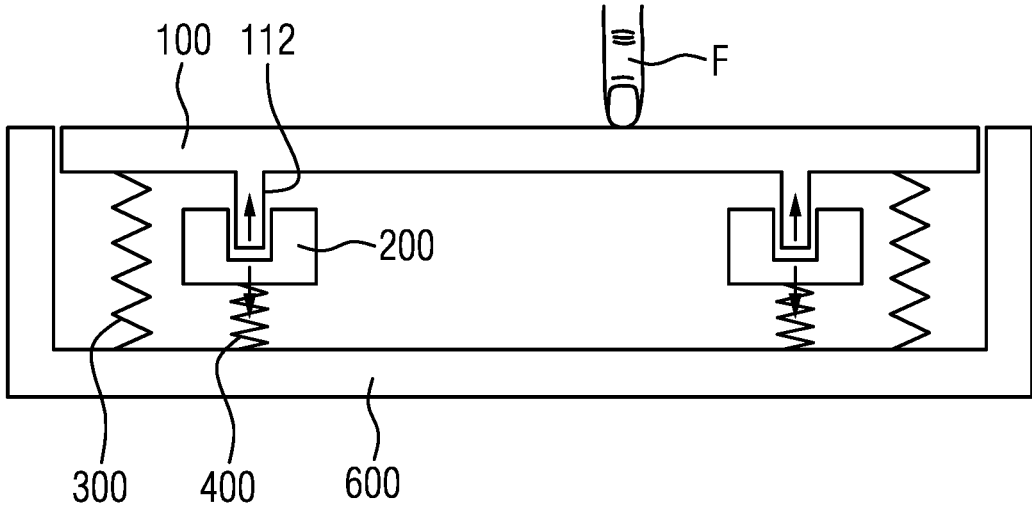
FIG. 2 shows a section through a second embodiment of the disclosure and the finger of the possible operator of the haptic operator control device.

The embodiment in FIG. 2 differs from the embodiment in FIG. 1 in that the actuator unit 200 has two actuators and two second spring elements 400. Furthermore, the input unit 100 has two coupling parts 112, so that the input unit 100 is moved by two actuators. The sequences of movements of the input unit 100 and the actuator unit 200 are as previously described in relation to FIG. 1.

Figure 3:
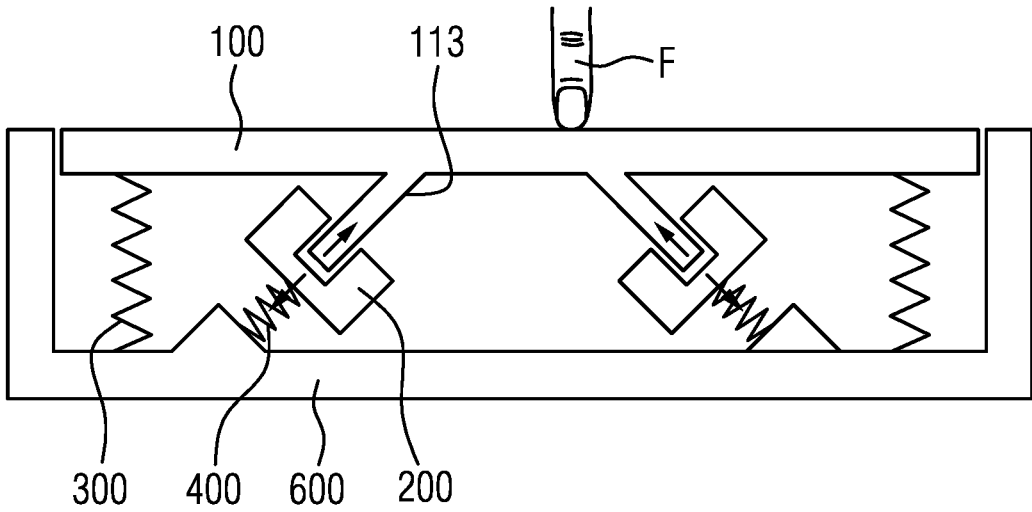
FIG. 3 shows a section through a third embodiment of the disclosure and the finger of the possible operator of the haptic operator control device.

The embodiment in FIG. 3 differs from the embodiment in FIG. 2 in that the coupling elements 113 are not arranged at right angles to the input unit 100 as in FIG. 2, but at an acute angle. This also changes the arrangement of the actuators of the actuator unit 200. Since the forces of the actuators of the actuator unit 200 in the lateral direction cancel each other out, the input unit 100 moves perpendicularly to the surface of the input unit 100. The structure is flatter overall in comparison with the embodiment according to FIG. 2. The sequences of movements of the input unit 100 and the actuator unit 200 are as previously described in relation to FIG. 1.

Figure 4:
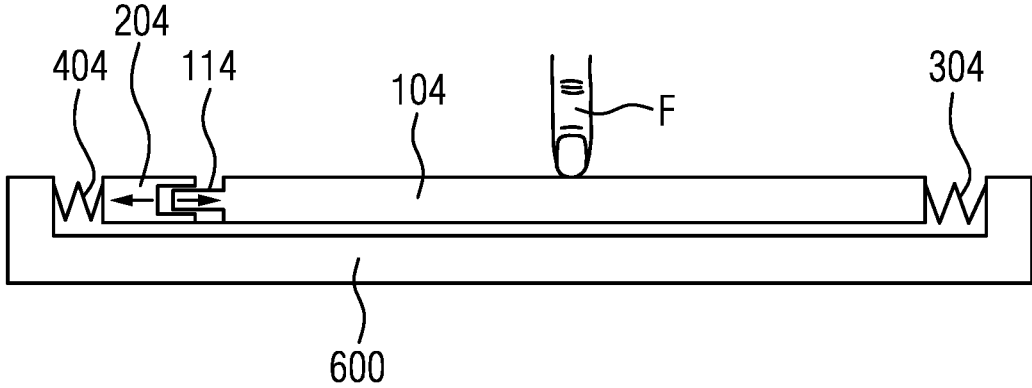
FIG. 4 shows a section through a fourth embodiment of the disclosure and the finger of the possible operator of the haptic operator control device.

In FIG. 4, an input unit 104 with a coupling part 114, an actuator unit 204, a first spring element 304, a second spring element 404 and a housing 600 can be seen. The input unit 104 is connected to the housing 600 by way of the first spring element 304 and the actuator 204 is connected to the housing 600 by way of the second spring element 404. Furthermore, the input unit 104 and the actuator unit 204 are mounted by way of bearings that are not shown. When the actuator unit 204 is actuated, it either attracts the input unit 104 or repels it, so that the input unit 104 is moved parallel to its surface, i.e. to the right or left in FIG. 4. The impulses generated by the input unit 104 and the actuator unit 204 cancel each other out, so that no impulse is introduced into the housing 600 by the exemplary embodiment of the operator control device according to the disclosure that is shown and no sound of a dull thud is generated either. The bearings (not shown) may be designed for example as ball bearings, roller bearings or plain bearings. The input unit 104 and the actuator 204 are each mounted in such a way that they are movable in the functioning direction of the actuator 204, but are fixed in the other directions. The input unit 100 is mounted in such a way that it is movable in the direction of movement of the input unit 100, but is fixed in the other directions.

The invention claimed is:

1. A haptic operator control device in a motor vehicle, comprising:
   an input unit;
   a coupling part fixedly connected to the input unit;
   an actuator unit having a single actuator, which is movably coupled to the coupling part connected to the input unit; and
   a housing for installation in a body of the motor vehicle, wherein the input unit is connected to the housing by way of two first spring elements, each of the two first spring elements having a first end directly connected to the input unit and a second end opposite the first end and directly connected to housing, wherein the actuator unit is connected to the housing by way of a second spring element separate from the first spring elements, wherein the actuator unit is configured to move the input unit by attracting the input unit and by repelling the input unit, wherein the input unit has a surface, wherein the surface can be touched by an input member of an operator, and wherein the input unit and the actuator unit are movably mounted in relation to the motor vehicle to eliminate a rolling motion when the input unit is moved.

2. The haptic operator control device as claimed in claim 1, wherein the actuator unit and the input unit have the same resonant frequency.

3. The haptic operator control device as claimed in claim 1, wherein a stiffness of the first spring device with respect to a mass of the input unit is equal to a stiffness of the second spring device with respect to a mass of the actuator unit.

4. The haptic operator control device as claimed in claim 1, wherein the input unit can be moved parallel to its surface.

5. The haptic operator control device as claimed in claim 1, wherein the input unit can be moved perpendicular to its surface.

6. The haptic operator control device as claimed in claim 1, wherein the first spring elements are directly connected to a surface of the housing opposite to and facing a rear surface of the input unit.

7. The haptic operator control device as claimed in claim 1, wherein the second spring element is directly connected to a surface of the housing opposite to and facing a rear surface of the input unit.

8. The haptic operator control device as claimed in claim 1, further comprising a sensor system configured to sense the touching of the surface of the input unit, wherein the actuator unit is controlled based on the sensed touching to cancel out movement of the input unit.

* * * * *